(12) United States Patent
Pouyez et al.

(10) Patent No.: US 6,275,642 B1
(45) Date of Patent: Aug. 14, 2001

(54) OPTICAL CONNECTOR

(75) Inventors: Philippe Pouyez, Argenteuil; Stéphane Doit, Chamonix; Pierre Kayoun, Boulogne, all of (FR)

(73) Assignee: Amphenol Socapex (FR)

( * ) Notice: Subject to any disclaimer, the term of this patent is extended or adjusted under 35 U.S.C. 154(b) by 0 days.

(21) Appl. No.: 09/307,551

(22) Filed: May 10, 1999

(30) Foreign Application Priority Data

May 12, 1998 (FR) .................................................. 98 05939

(51) Int. Cl.⁷ ...................................................... G02B 6/00
(52) U.S. Cl. ............................................. 385/137; 385/65
(58) Field of Search ................................. 385/137, 65, 83, 385/76, 98

(56) References Cited

U.S. PATENT DOCUMENTS

| | | | |
|---|---|---|---|
| H491 | * | 7/1988 | Pitruzzello et al. .................. 385/140 |
| 4,102,561 | | 7/1978 | Hawk et al. ........................ 350/96.21 |
| 4,363,532 | * | 12/1982 | Weber .................................. 359/385 |
| 4,432,602 | | 2/1984 | Margolin .............................. 350/96.2 |
| 4,643,540 | * | 2/1987 | Kawasaki et al. .................... 359/388 |
| 5,080,461 | | 1/1992 | Pimpinella ............................. 385/64 |
| 5,703,714 | * | 12/1997 | Kojima .................................. 359/368 |
| 5,896,224 | * | 4/1999 | Kapitza ................................. 359/389 |

FOREIGN PATENT DOCUMENTS

| | | | |
|---|---|---|---|
| 0 505 197 | 9/1992 | (EP) | ................. G02B/6/38 |
| 0 786 834 | 7/1997 | (EP) | ................. H01R/23/02 |

* cited by examiner

*Primary Examiner*—Audrey Chang
*Assistant Examiner*—Euncha Cherry
(74) *Attorney, Agent, or Firm*—Blank Rome Comisky & McCauley, LLP

(57) ABSTRACT

The invention relates to a device for accurately positioning the ends of optical fibers in a bundle. The comprises an elongate one-piece solid body in which a slot is formed that passes right through the body in a length direction, the section of said slot in planes perpendicular to the length direction being a closed curve having a first side and a second side that extend substantially parallel to each other, at least one of said sides being of undulating shape, being constituted by alternating peaks and troughs, the space defined by a trough and the facing portion of the other side being suitable for receiving an optical fiber with little clearance, the spaces corresponding to peaks being unsuitable for receiving respective fibers.

15 Claims, 4 Drawing Sheets

OPTICAL CONNECTOR

FIELD OF THE INVENTION

The present invention relates to the field of connectors for optical fibers.

More precisely, the invention relates to a device for positioning the ends of optical fibers, in particular those belonging to a ribbon-type bundle, and also to the use of such a positioning device in making an optical connector and in making a splice device for splicing together a plurality of bundles of optical fibers.

BACKGROUND OF THE INVENTION

More and more high performance systems are being made in which information is conveyed in the form of optical signals. For this purpose, optical fibers have been developed that present ever increasing performance, and have ever increasing numbers of active optical components for emitting light and for receiving it. In particular, optical connectors have been developed that enable two bundles of optical fibers to be connected together or that enable a bundle of optical fibers to be connected to optical apparatus (an emitter, a receiver, an attenuator, a sensor, etc.).

Optical connectors are components which serve to provide relative and absolute positioning between the ends of optical fibers in a bundle of optical fibers in a manner that is very accurate. To obtain such very accurate positioning, optical connectors generally comprise a large number of parts that are machined with very great precision so as to obtain the required positioning for the ends of the optical fibers. This means that such connectors are relatively expensive to manufacture. This cost situation can be accepted when connectors form portions of relatively sophisticated systems which are themselves of relatively high cost.

However, in the context of less elaborate optical systems becoming more widespread, the cost of manufacturing optical connectors is becoming a critical point in the cost of such systems.

There thus exists a real need for optical connectors which, while still providing acceptable positioning for the ends of optical fibers, are of lower manufacturing cost and are thus compatible with manufacturing techniques that make mass production possible.

OBJECTS AND SUMMARY OF THE INVENTION

An object of the present invention is provide a device for positioning the ends of optical fibers in a bundle where the manufacturing cost of the device is reduced.

According to the invention, this object is achieved by a device for positioning the ends of optical fibers in a bundle, the device comprising an elongate one-piece solid body in which a slot is formed that passes right through the body in a length direction, the section of said slot in planes perpendicular to the length direction being a closed curve having a first side and a second side that extend substantially parallel to each other, at least one of said sides being of undulating shape, being constituted by alternating peaks and troughs, the space defined between a trough and the facing portion of the other side being suitable for receiving an optical fiber with little clearance, the spaces corresponding to peaks being unsuitable for receiving respective fibers.

It will be understood that because the positioning device is essentially constituted by a one-piece body in which there is formed a slot defined by mutually parallel generator lines, it is possible to manufacture the body using extrusion or molding techniques applied to a plastics material or to a metal, which naturally makes it possible to reduce manufacturing cost very considerably.

It will also be understood that the slot is constituted, in right section, by alternating spaces suitable for receiving a single fiber each and spaces of dimensions that do not enable them to receive a fiber at all. This greatly simplifies inserting the ends of optical fibers into the positioning device.

In a preferred embodiment, the second side of the right section of the slot is also constituted by alternating peaks and troughs in which the troughs of the first side are in register with the peaks of the second side.

In this preferred embodiment, it will be understood that while still providing the same quality of positioning, the slot has a right section of dimensions that are larger and that make it possible to use an extrusion or molding core having improved mechanical characteristics, thus making use thereof considerably more easy.

The invention also provides the use of the positioning device in making an optical connector element, in which use said body has a face for connection with another connector element, and said face is provided with means for positioning it relative to the other connector element.

The invention also provides the use of the above-defined positioning device in making a splice block between at least two optical fiber ribbons, in which use said body has first and second end faces into which said slot opens out, and means for securing each end of the two bundles of optical fibers to be connected with the body of the splice block.

BRIEF DESCRIPTION OF THE DRAWINGS

Other characteristics and advantages of the invention will appear more clearly on reading the following description of various embodiments of the invention given as non-limiting examples. The description refers to the accompanying drawings, in which.

MORE DETAILED DESCRIPTION

Figure 1:
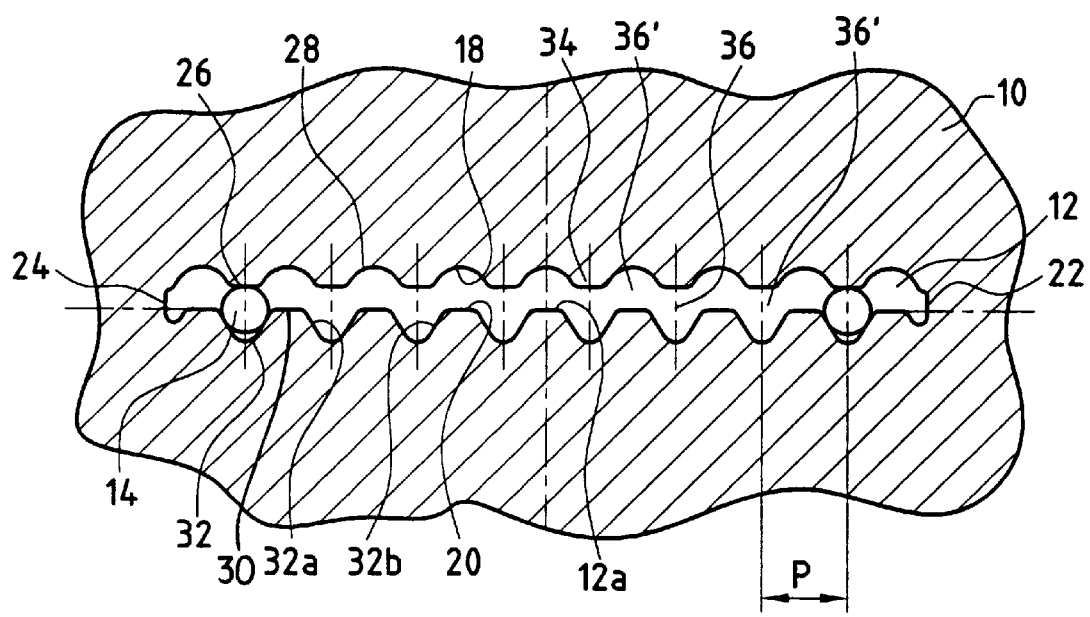
FIG. 1 is a theoretical cross-section showing how the optical fiber alignment device is implemented.

With reference initially to FIG. 1, there follows a description of the principle of the optical fiber positioning device of the invention. The device is constituted by a one-piece body 10 in which there is formed a longitudinal slot 12 suitable for receiving and positioning the ends of optical fibers 14, e.g. from the bundle constituting an optical fiber ribbon. The slot 12 has a closed inside wall 12a whose right section is a closed curve as shown in FIG. 1. The entire slot presents an inside wall 12a which is in the form of a closed surface that is cylindrical in the sense that it is bonded by two planes parallel to the plane of FIG. 1 and by the locus of a generator line moving round the closed curve shown in FIG. 1. More precisely, the right section of the slot 12 is constituted by a first side 18 and by a second side 20 which are substantially parallel to each other, said sides being interconnected by end portions 22 and 24 so as to constitute a closed curve. As shown in FIG. 1, each of the sides 18 and 20 of the right section is constituted by an undulating curve in the form of waves presenting alternating peaks 26 and troughs 28 for the top side 18 and peaks 30 and troughs 32 for the bottom side 20. The undulations of the side 20 have troughs 32 each substantially defined by two segments 32a and 32b defining an isosceles triangle. However, in a preferred embodiment, the peaks 26 on the side 18 include respective slightly flattened portions 34. Overall, the waves in the top side 18 are in phase opposition to the waves in the bottom side 20. Thus, the sides 32a and 32b of a trough in the side 20 co-operate with the end 34 of a peak on the side 18 so as to define a longitudinal volume given overall reference 36 and of dimensions that correspond to the diameter of an optical fiber 14. In contrast, if the longitudinal volume 36' as defined by a trough 28 in the first side 18 and by a peak 30 in the second side 20 is considered, then the dimensions thereof are too small to receive a fiber. In other words, if the right section of the slot 12 is considered, it is constituted by alternating spaces 36 that are suitable for receiving a respective fiber and spaces 36' that are unsuitable for receiving a fiber. Thus, between these three surface portions, positioning is achieved that can be quite accurate for the end of an optical fiber 14 inside the slot 12. In section, these three surface portions define three contact points for each fiber. The pitch p between two troughs 32 in the bottom side 20 corresponds to the spacing that is desired between two adjacent optical fibers.

Because the slot 12 that is to be made inside the body 10 is defined by an internal wall in the form of a closed surface that is cylindrical in the geometrical sense, it is possible to make the positioning device by a technique of extruding or molding a suitable plastics material or metal material, thereby making it possible to receive a low manufacturing cost.

By way of example, provision could also be made for the top side 18 of the right section of the slot 12 to be constituted by a rectilinear portion corresponding to the flattened ends 34 of the peaks. Individual elementary volumes 36 would still be obtained that are suitable for receiving respective optical fibers. Nevertheless, it will be understood that the extrusion core would then be of smaller dimensions which would make it more difficult to make. In contrast, in the preferred embodiment as shown in FIG. 1, the thickness of the slot 12 is substantially constant between the sides 18 and 20, thus making it possible to use an extrusion core of a shape that is more suitable.

Figure 3:
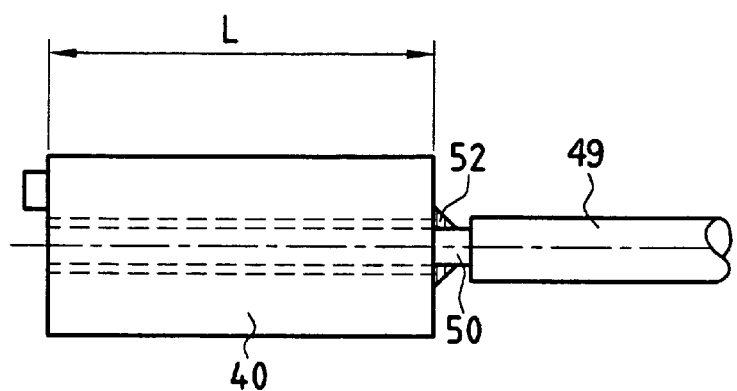
FIG. 3 is a side view of the FIG. 2 connector element.
Figure 2:
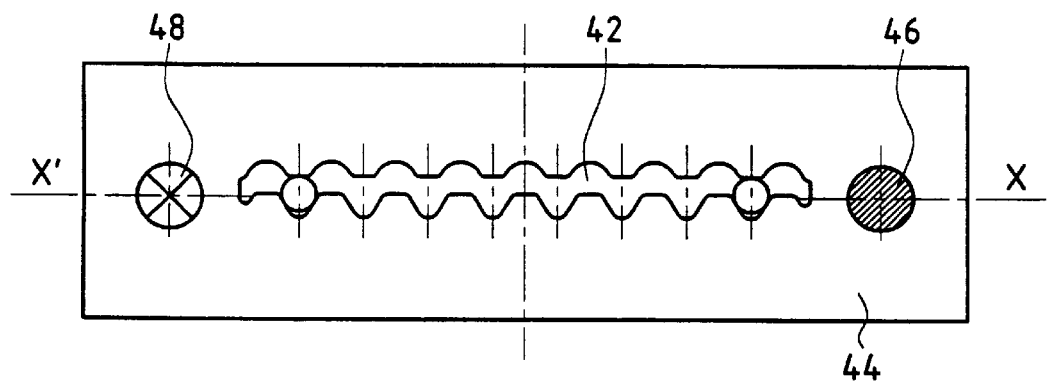
FIG. 2 is an end view of a first embodiment of an optical connector element.

In FIGS. 2 and 3, there are shown a first embodiment of an optical connector element using the positioning device described with reference to FIG. 1. This connector element comprises a body 40 in the form of a rectangular parallel-epiped which thus has a slot 42 located on a midplane XX', the slot 42 extending along the entire length L of the body of the connector element. The slot 42 has the shape shown in FIG. 1.

In FIG. 2, the front face 44 of the connector element is shown as having a peg 46 and a hole 48 enabling the connector element to be positioned relative to another connector element. In FIG. 3, a bundle of optical fibers in ribbon form 49 is shown diagrammatically together with the ends of the optical fibers 50 which are stripped of their protective coverings, said stripped ends 50 of the optical fibers being inserted into the positioning volumes 36 of the slot 42. Also shown diagrammatically is a deposit of adhesive material 52 for securing the optical fibers to the connector element 40. Provision should also be made for a mechanical part for locking the optical fibers in the slot by wedging.

Figure 4:
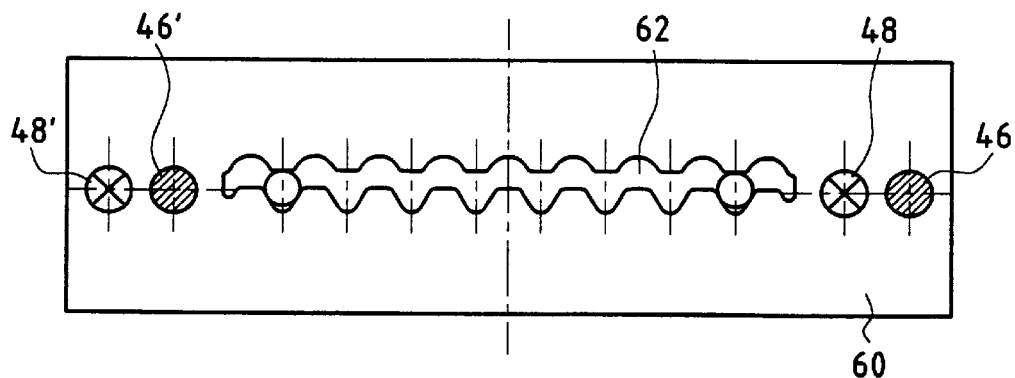
FIG. 4 shows a variant of the FIG. 2 connector element.

FIG. 4 shows a variant embodiment of the connector element 60 which has a longitudinal slot 62 identical to that of FIG. 2, but in which the connector element has two centering pegs 46 and 46' and two centering holes 48 and 48'. It will thus be understood that the two connector elements for associating with each other are strictly identical.

Figure 5:
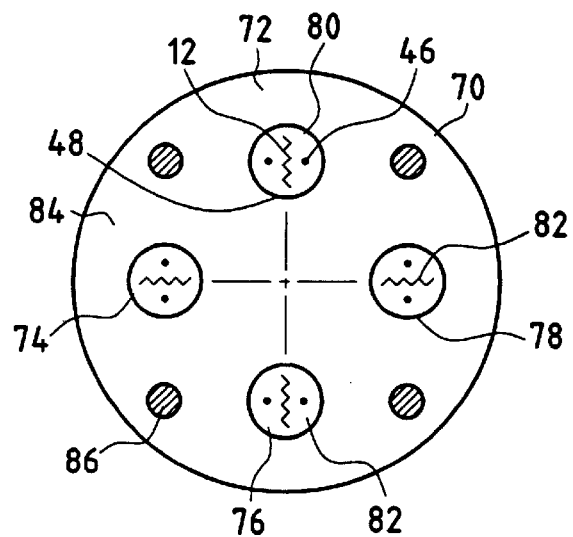
FIG. 5 is an end view of an optical connector element suitable for connecting a plurality of optical fiber bundles.

In the embodiment of the connector shown in FIG. 5, the connector has a cylindrical cover 70 provided with internal insulation 72 forming a structure which defines four cylindrical or frustoconical housings 74, 76, 78, and 80 located on four radii at 90° intervals in the insulating structure 72, each of the housings being suitable for receiving with a small amount of clearance a connection element of the type shown in FIG. 2 but in this case having a body that is cylindrical or frustoconical. Each individual connector element given reference 82 is thus mounted to "float" in the associated housing. The end face 84 of the connector element is provided with two identifying and positioning pegs 86 for positioning relative to the other element of the connector. Each unit connector element 82 itself has its own positioning peg 46 and a positioning hole 48 as shown in FIG. 2. When two connector elements of the type shown in FIG. 5 are coupled together, then the two connector elements are subject to overall mutual positioning, and each elementary connector 82 of one connector element is subjected to positioning relative to the corresponding elementary connector 82 of the other connector element.

This disposition is particularly advantageous since the structure 72 with its cylindrical housings is identical to the insulating body that is used in an electrical connector. It is thus possible to make a connector element that is both optical and electrical, with two housings being occupied by electrical contacts and with two housings being occupied by elementary optical connector elements.

Figure 6:
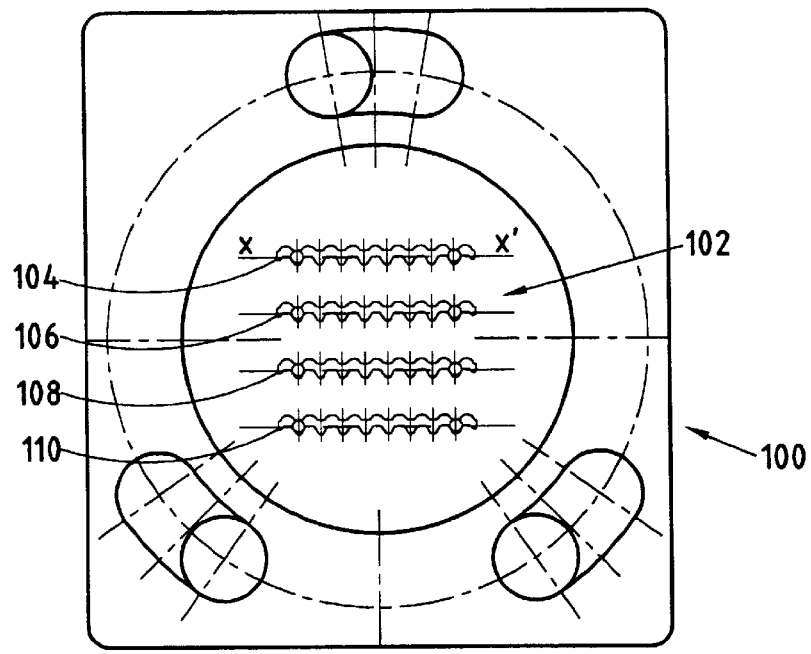
FIG. 6 is an end view of another variant embodiment of an optical connector for a plurality of bundles of optical fibers.

The connector element 100 shown in FIG. 6 has a one-piece body 102 which is pierced by four slots 104, 106, 108, and 110 that are identical to the slot shown in FIG. 1. The midplanes XX' of the slot are parallel to one another. Each slot can receive the optical fibers from the bundle in an optical fiber ribbon.

Figure 7A:
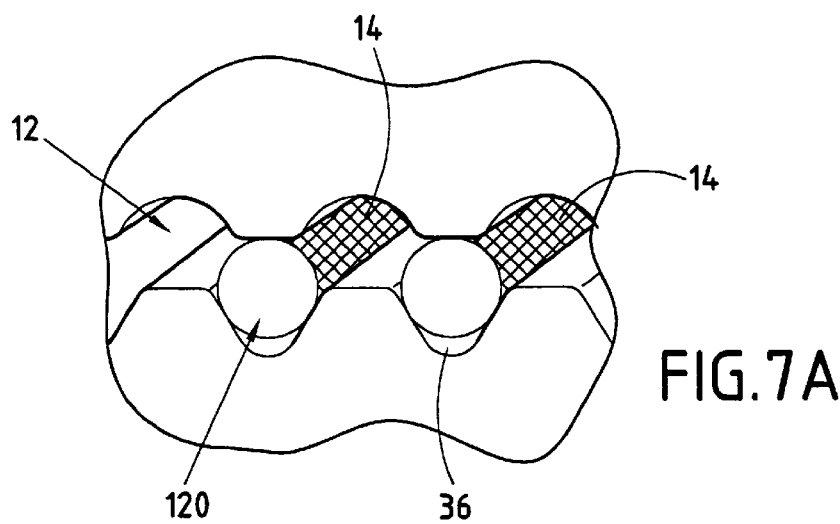
FIGS. 7A and 7B show an embodiment of optical connector elements in which the optical fibers are associated with respective optical lenses.
Figure 7B:
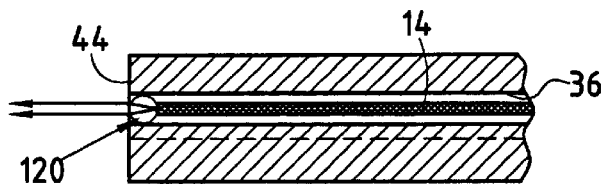

FIGS. 7A and 8B show a variant embodiment of the connector element shown in FIGS. 2 and 3. In this embodiment, each volume 36 of the slot 12 that is to receive an optical fiber 14 is provided close to its connection face 44 with an optical lens 120 fixed in said volume. The lenses are preferably made using microbeads of transparent material.

Figure 8:
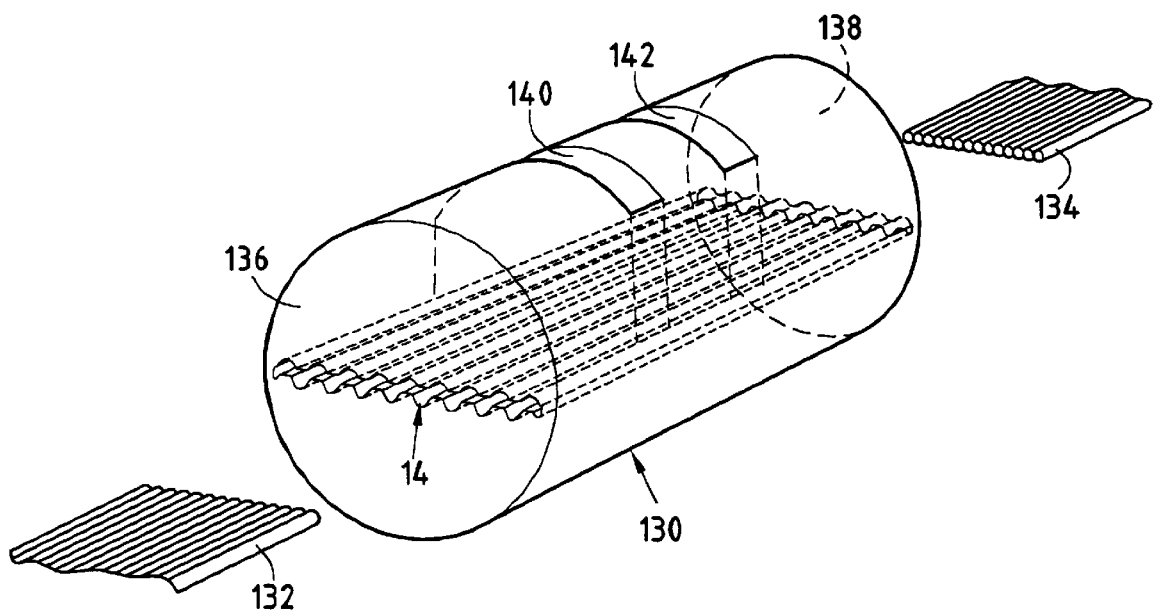
FIG. 8 shows an embodiment of a splice device for interconnecting two ribbon type optical fiber bundles.

FIG. 8 shows the use of the one-piece positioning device of FIG. 1 to make a splice block 130 for splicing together two optical fiber ribbons 132 and 134. The one-piece body 130 is pierced by a slot 12 having the shape shown in FIG. 1 and extending between two end faces 136 and 138 of the splice block. One end of each bundle of fibers 132 and 134 is inserted into the slot 12. Wells 140 and 142 enable means to be inserted for holding the ends of the bundles. Thus, the end of each optical fiber in a bundle is exactly in register with the corresponding fiber of the other bundle.

Figure 9:
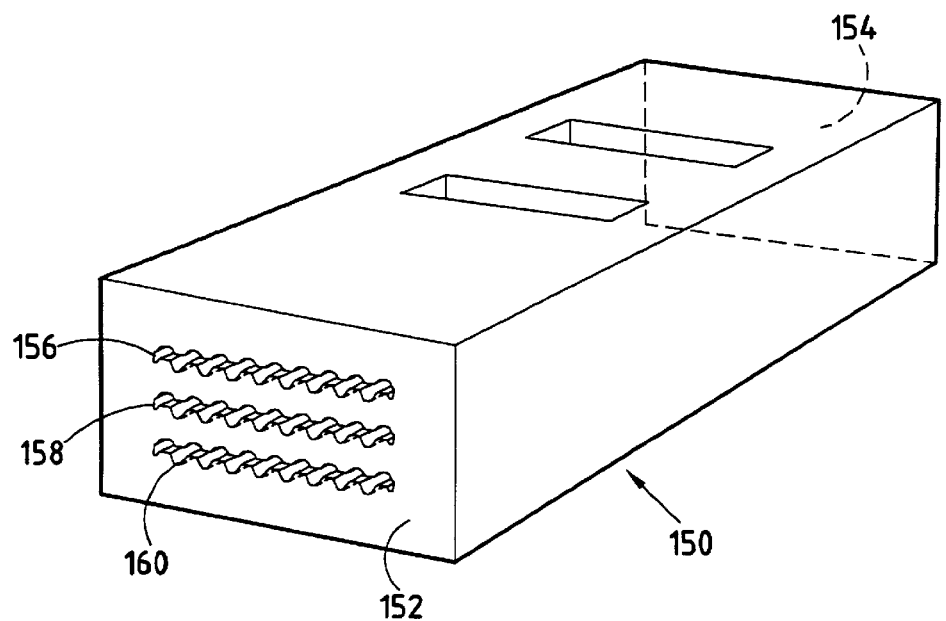
FIG. 9 is a view of a splice device for interconnecting a plurality of ribbon optical bundles.

FIG. 9 shows a variant embodiment of the splice block of FIG. 8. The body 150 is pierced by n mutually parallel slots which extend between the two faces 152 and 154 of the body 150. In FIG. 9, there are three slot 156, 158, and 160, thus making it possible to interconnect three pairs of bundles.

It should also be emphasized that the optical fibers can be prevented from moving in the slot by mechanical means that wedge the fibers. For example, the posterior face of the body can be slightly deformed in the region of the slot to provide such wedging.

What is claimed is:

1. A device for accurately positioning the ends of optical fibers in a bundle, the device comprising an elongate one-piece solid body in which a slot is formed that passes right through the body in a length direction, a section of said slot in planes perpendicular to the length direction being a closed curve having a first side and a second side that extend substantially parallel to each other, at least one of said sides being an undulating wave-like shape in the form of alternating peaks and troughs, each trough and a facing portion of the other side defining spaces configured to receive an optical fiber with little clearance, the peaks and a facing portion of the other side defining spaces not configured to receive respective fibers wherein the second side of a right section of the slot is also constituted by alternating peaks and troughs in which the troughs of the first side are in register with the peaks of the second side, the space corresponding to a trough in the second side being configured to receive a fiber while the space corresponding to a peak in the second side is not configured to receive a fiber.

2. A positioning device according to claim 1, wherein, in the right section of the slot, the flanks of a trough in the second side and a top of a corresponding peak in the first side define three contact points for the optical fiber.

3. The device of claim 1, wherein the body is made by molding a plastics material or by casting a metal.

4. The device of claim 1, wherein the body is made by extruding a plastics material or a metal.

5. An optical connector element comprising an elongate one-piece solid body in which a slot is formed that passes right through the body in a length direction, a section of said slot in planes perpendicular to the length direction being a closed curve having a first side and a second side that extend substantially parallel to each other, at least one of said sides being of undulating shape, being constituted by alternating peaks and troughs, each trough and a facing portion of the other side defining spaces configured to receive optical fibers with little clearance, the peaks and a facing portion of the other side defining spaces not configured to receive respective fibers, said body further having a face for connection with another connector element, said face being provided with means for positioning it relative to the other connector element, wherein the second side of a right section of the slot is also constituted by alternating peaks and troughs in which the troughs of the first side are in register with the peaks of the second side, the space corresponding to a trough in the second side being configured to receive a fiber while the space corresponding to a peak in the second side is not configured to receive a fiber.

6. The optical connector of claim 5, wherein said body comprises a plurality of said slots that are substantially identical and that are placed parallel to one another.

7. The optical connector of claim 5 further comprising at least an optical lens disposed close to a connection face and placed in a space defined by a trough in the second side of a slot and the facing portion of the other side.

8. The optical connector of claim 5, wherein said positioning means comprise at least one positioning finger engaged in a space of the slot.

9. The optical connector of claim 5, wherein the body is made by molding a plastics material or by casting a metal.

10. The optical connector of claim 5, wherein the body is made by extruding a plastics material or a metal.

11. The optical connector of claim 5, further comprising mechanical wedging, for holding stationary said optical fibers.

12. An optical connector comprising an external structure that is pierced by a plurality of mutually parallel cylindrical or frustoconical housings opening out into a connection face, and a plurality of positioning devices, each device comprising an elongate one-piece solid body in which a slot is formed that passes right through the body in a length direction, the section of said slot in planes perpendicular to the length direction being a closed curve having a first side and a second side that extend substantially parallel to each other, at least one of said sides being of undulating shape, being constituted by alternating peaks and troughs, each trough and a facing portion of the other side defining spaces configured to receive optical fibers with little clearance, the peaks and a facing portion of the other side defining spaces not configured to receive respective fibers, each positioning device having a body that is cylindrical and being mounted with clearance in a corresponding one of said housings, wherein the second side of a right section of the slot is also constituted by alternating peaks and troughs in which the troughs of the first side are in register with the peaks of the second side, the space corresponding to a trough in the second side being configured to receive a fiber while the space corresponding to a peak in the second side is not configured to receive a fiber.

13. A splice block for splicing together at least two optical fiber ribbons, said splice block comprising an elongate one-piece solid body in which a slot is formed that passes right through the body in a length direction, the section of said slot in planes perpendicular to the length direction being a closed curve having a first side and a second side that extend substantially parallel to each other, at least one of said sides being of undulating shape, being constituted by alternating peaks and troughs, each trough and a facing portion of the other side defining spaces configured to receive optical fibers with little clearance, the peaks and a facing portion of the other side defining spaces not configured to receive respective fibers, said body having first and second end faces into which said slot opens out, wherein the second side of a right section of the slot is also constituted by alternating peaks and troughs in which the troughs of the first side are in register with the peaks of the second side, the space corresponding to a trough in the second side being configured to receive a fiber while the space corresponding to a peak in the second side is not configured to receive a fiber.

14. A device for accurately positioning the ends of optical fibers in a bundle, the device comprising an elongate one-piece solid body in which a slot is formed that passes right through the body in a length direction, a section of said slot in planes perpendicular to the length direction being a closed curve having a first side and a second side that extend substantially parallel to each other, at least one of said sides being an undulating wave-like shape presenting alternating peaks and troughs, each trough and a facing portion of the other side defining spaces configured to receive an optical fiber with little clearance, the peaks and a facing portion of the other side defining spaces not configured to receive respective fibers, wherein the second side of a right section of the slot is also constituted by alternating peaks and troughs in which the troughs of the first side are in register with the peaks of the second side, the space corresponding to a trough in the second side being configured to receive a fiber while the space corresponding to a peak in the second side is not configured to receive a fiber.

15. A positioning device according to claim 14, wherein, in a right section of the slot, the flanks of a trough in the second side and a top of a corresponding peak in the first side define three contact points for the optical fiber.

* * * * *